Oct. 19, 1943.     W. C. DILLON     2,332,136
DYNAMOMETER
Filed Sept. 13, 1941
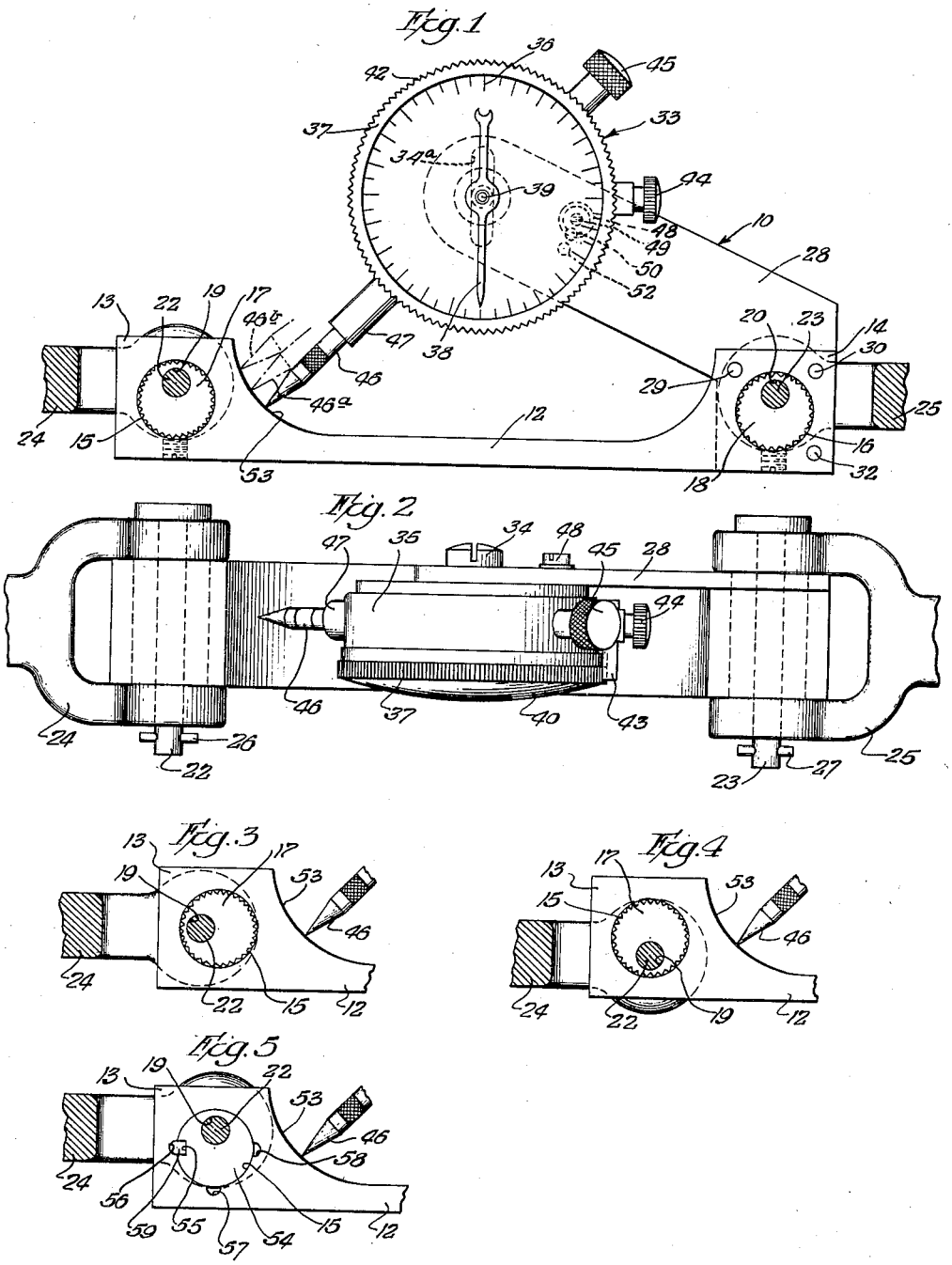
Inventor:
William C. Dillon
BY
Sheridan, Davis + Cargill
Attys.

Patented Oct. 19, 1943

2,332,136

UNITED STATES PATENT OFFICE 2,332,136

DYNAMOMETER

William C. Dillon, Chicago, Ill., assignor to W. C. Dillon & Company, Inc., Chicago, Ill., a corporation of Illinois Application September 13, 1941, Serial No 410,715

3 Claims. (Cl. 265—68)

This invention relates to dynamometers of the type utilized in the measurement of exerted forces.

An object of this invention is to provide a force measuring dynamometer including parts adapted to be preset to determine the force necessary for full scale deflection.

Another object of this invention is to provide a force measuring dynamometer including parts movable to various positions to change the force required to effect full scale deflection.

Another object of this invention is to provide a dynamometer structure which, with a given set of parts, is adapted to be assembled for the measurement of forces of considerably different maximum values for full scale deflection.

Another object of this invention is to provide a force measuring dynamometer having adjustments which may be made to compensate for manufacturing variations in parts of the dynamometer and thereby to enable preadjustment commensurate with reasonable accuracy.

Other objects and advantages of the invention relate to features of construction and arrangement of parts which will be apparent from a consideration of the following specification and accompanying drawing, wherein:

Figures 1 and 2 are, respectively, front and top elevation views of a preferred embodiment of this invention; and Figs. 3, 4 and 5 are fragmentary sectional views of a portion of the dynamometer illustrated in Figs. 1 and 2 which illustrate modifications of a portion of the structure.

Having particular reference to Figs. 1 and 2, a dynamometer 10 includes a flexible bar 12 of steel or other suitable material, the physical dimensions and the material of which are selected to suit requirements of flexibility commensurate with the exerted forces which are to be measured with the instrument. The flexible bar 12 has enlarged angularly projecting end portions 13 and 14 which preferably project from the same side of the bar 12. Openings 15 and 16 are provided in the enlarged end portions 13 and 14 of the bar, the centers of which openings are offset from the longitudinal axis of the flexible mid-portion of the bar. The openings 15 and 16 are illustrated as being round, but may well be of some other shape such as hexagonal or octagonal. Plugs or blocks 17 and 18 fit tightly into the openings 15 and 16, respectively, and have smaller openings 19 and 20, respectively therethrough which are displaced from the centers of the respective plugs or blocks. The plugs or blocks 17 and 18 preferably have knurled outer surfaces to aid in resisting rotary movement of the blocks in the openings.

Pins 22 and 23 extend through the openings 19 and 20, respectively, and provide supports for rotatably securing yokes 24 and 25 to the ends of the bar. The yokes 24 and 25 are adapted to have suitable elements secured thereto for applying the force to be measured to the dynamometer.

The cross section of the mid-portion of the bar 12 is reduced and the openings 19 and 20 are displaced to one side of the longitudinal axis of the reduced portion of the bar so that either tensile or compressive force applied to the bar through the yokes 24 and 25 effects flexure of the mid-portion of the bar. The positions of the blocks or plugs 17 and 18 in the openings 15 and 16 determines the distance between the openings 19 and 20 and the longitudinal axis of the flexible section of the bar. Since the distance of the openings 19 and 20 from the longitudinal axis of the flexible section of the bar determines the leverage of the applied force upon that flexible section, the required force for producing a predetermined flexure of the bar may be appreciably altered by the selection of the position of the plugs or blocks 17 and 18 in the openings 15 and 16. Through the use of the plugs or blocks illustrated herein, dynamometers may be provided from parts which have considerably different maximum force measuring ranges.

The projecting portions 13 and 14 of the bar are preferably sufficiently thick or heavy as compared to the flexible mid-portion of the bar that the flexure of those end portions of the bar is not appreciable with respect to the flexure of the mid-portion of the bar. When tensile forces are to be measured, the openings 19 and 20 and the pins 22 and 23 are preferably round so that the yokes 24 and 25 are rotatable with respect to the bar. With these parts relatively rotatable, the bar aligns itself with the applied linear force and is not distorted due to an angularly applied force. However, in some instances where compressive forces are to be measured, it is preferable that the pins and openings are angular so as to prevent rotation of the bar upon the application of compressive force. In either instance, the pins 22 and 23 are held in place by cotter pins 26 and 27, or other suitable means.

A supporting arm 28 is non-rotatably secured to one end of the bar 12 by spaced rivets or pins 29, 30 and 32 which extend through the bar 12 and support the arm 28. The support arm 28 is also preferably set into a notch or recess in the side of the bar 12 to improve the support therefor and so that the outer surface of the support arm is flush with the surface of the bar. The support arm 28 is angularly disposed with respect to the longitudinal axis of the bar and preferably extends somewhat toward the other end of the bar from that to which it is secured.

An indicating device 33 is secured to the extending portion of the support arm 28, preferably near the extending end thereof, by a screw or other suitable fastening means 34 which extends through the support arm and is threaded into the back of the indicating device. A slot 35 is preferably provided in the arm 28 through which the screw 34 extends, and is preferably elongated in a direction transverse to the bar 12 to provide for movement of the indicating device 33 when the screw 34 is loosened. This movement of the indicating device provides a preliminary adjustment for establishing the proper zero position of the indicator when the bar is unflexed and for providing proper preliminary setting or positioning of the parts during the initial calibration of the instrument.

The indicating device 33 may be any one of a number of standard indicating devices which are on the market, and has been indicated as a standard type of plunger-actuated dial indicator, such as are manufactured by well known companies and known as "dial indicators." The indicating device 33 has a case 35, a calibrated dial 36 and a rim or bezel 37 which is rotatably mounted on the case 33 and has the dial 36 secured thereto. A hand or pointer 38 is rotatably mounted on the shaft 39 in cooperative relation with respect to the dial 36 and concentric with regard thereto. A transparent glass cover 40 is secured to the rim or bezel 37 to cover the dial 36 and pointer 38. The outer edge of the rim or bezel 37 is preferably knurled or grooved as at 42 to facilitate manual movement of the rim or bezel with respect to the case 35. After adjustment of the position of the dial 36 with respect to the pointer 38 by movement of the rim or bezel 37, it is secured in position by a clamp 43, which tightened against the surface of the rim or bezel by a thumb-screw 44 which extends through the clamp 43 and is threaded into the case 35. The indicating device preferably has a handle 45 secured to the case 35 and projecting therefrom.

The indicating device 33 includes a standard multiplying mechanism, which is not shown, but which effects rotary movement of the pointer 38 in response to linear movement of the plunger 46 which is slidably mounted in a sleeve 47 which is secured to the case 35. The plunger 46 is biased outwardly away from the case 35 so that outward movement responsive to the biasing force keeps the plunger in contact with the bar during flexure of the bar to actuate the pointer in one direction. Inward movement of the plunger toward the case 35 which occurs during flexure rotates the pointer in the other direction.

In the preferred embodiment of this invention, the indicating device 33 is so disposed with respect to the bar 12 that the plunger 46 engages the surface of the bar near the end of that bar opposite the end to which the support arm 28 is secured. With the plunger 46 biased against the surface of the bar 12, the pointer 38 is in its normal zero position when the bar 12 is unflexed and there is no force applied thereto through the yokes 24 and 25. Also, in the preferred embodiment of this invention, the position of the indicating device 33 is preferably adjusted so that the point at which the plunger 46 engages the surface of the bar 12 may be varied to vary the range of force which may be measured by the dynamometer without changing any of the parts thereof, as well as to a point at which it accurately follows the calibrated scale. In the illustrated dynamometer, a screw 48 extends through one of a plurality of openings 49, 50, and 52 in the support arm 28 and is threaded into the case 35. By changing the opening through which the screw 48 extends, the angular position of the indicating device with respect to the support arm 28 is varied. This variation in the angular position of the indicating device varies the point of engagement of the plunger 46 with the bar 12, as indicated in dot-and-dash lines at 46$^a$ and 46$^b$. The surface of the bar which is engaged by the plunger 46 is preferably curved as at 53. This curved surface not only acts as a fillet to strengthen the bar, but is concentric with respect to the axis of rotation of the indicating device about the axis of the screw 34, so that the position of the plunger 46 with respect to the indicating device remains substantially the same in any of the positions to which the indicating device is adjusted. Different calibrations on the dial, which may be put on in different colors or in different rows, or a multiplying factor for the standard dial indicator, may be utilized to indicate the range of forces measurable at the different positions to which the indicating device is adjusted.

In the modifications of the device illustrated in Figs. 3, 4 and 5, reference numerals similar to those previously used refer to like parts which perform similar functions. In Figs. 3 and 4 the parts of the device are the same as those illustrated in Fig. 1 and previously described. However, Fig. 3 shows the adjustment of the plug or block 17 to an intermediate position such that the pin 22 is closer to the longitudinal axis of the flexible portion of the bar 12 than the placement which is illustrated in Fig. 1. Such adjustment of the position of the plug or block 17 with respect to the bar 12 makes necessary the application of a greater force to the bar 12 to effect the same deflection or rotary movement of the pointer 38. In Fig. 4, the plug or block 17 is set in an extreme position, such that the pin 22 is even closer to the longitudinal axis of the flexible portion of the bar 12 than that illustrated in Fig. 3. Such adjustment of the plug or block 17 makes necessary the application of even greater force to the bar 12 to effect a particular deflection or rotary movement of the pointer 38. It is, therefore, apparent that the placement or selection of the position of the plug or block 17 determines and considerably changes the maximum limit of measurable force for a given diameter which is made from particular sizes and types of parts.

In the modification illustrated in Fig. 5, a plug or block 54 has a keyway 55 therein. Cooperating keyways such as 56, 57 and 58 are provided adjacent the opening 15 in the bar 12 which, together with the keyway 55, accommodate a key 59 which determines the position of the plug or block 54 with respect to the bar 12. The adjustment of the position of the plug or block 54 determines the distance of the pin 22 from the longitudinal axis of the flexible portion of the bar.

In the operation of the dynamometer, a force, such as a tensile force, is applied to the dynamometer through the yokes 24 and 25 by any suitable means secured thereto. The application of the force to the bar 12 through the yokes 24 and 25 effects a flexure of the bar, since the axis or line of application of the force is displaced with respect to the longitudinal axis of the midportion of the bar. The flexure of the bar effects relative movement between the ends thereof so that the support arm 28 moves angularly with respect to the bar and the indicating device moves relatively with respect to the surface of the bar which is engaged by the plunger 46. The plunger 46, being biased into engagement with the surface of the bar, follows the relative movement effected by the flexure and produces a corresponding movement of the pointer 38 with respect to the dial 36. Since the flexure of the bar is directly dependent upon the force applied thereto, the corresponding movement of the pointer 38 is also dependent upon the applied force.

When compression forces are applied to the bar instead of tensile forces, the action of the device is similar and a flexure of the bar is effected which is dependent upon the force applied, but the movements of the plunger 46 and the pointer 38 are in the opposite direction from those produced by tensile forces.

Although the characteristics of the bar 12, which are controlled by the material and dimensions thereof, control the general range of forces which may be measured by a single dynamometer of the type disclosed, the range of such a dynamometer may be materially changed by alteration of the positions of the plug or blocks 17 and 18, and smaller variations in the range of the dynamometer may be accomplished by changing the position of the indicating device to vary the position at which the plunger 46 engages the bar 12.

While an embodiment of the invention has been shown and described for the purpose of illustration, the applicant does not wish to be restricted specifically thereto since various modifications may be made without departing from the spirit of the invention.

What is claimed as new and upon which it is desired to secure Letters Patent of the United States is:

1. A dynamometer comprising, in combination, a flexible bar having integral angularly disposed portions, means for applying force to the angularly disposed portions for effecting flexure of the bar which is dependent upon the force applied, means adapted to be preadjusted to predetermine the position of applying force to the angularly disposed portions to predetermine thereby the force required to effect a given flexure of the bar, a rigid arm rigidly secured to one end of the flexible bar, a plunger actuated dial indicator secured to said arm at a position spaced from the bar and so disposed that said plunger rests against the bar at a place which is spaced from the arm, and means for adjusting the position of the indicator linearly and angularly with respect to the arm, said plunger being responsive to the flexure of the bar to actuate the indicator.

2. A dynamometer comprising, in combination, a bar having a straight flexible portion and substantially rigid angularly disposed means at the ends thereof, means for applying force to the angularly disposed means in a direction substantially parallel to the straight flexible portion thereby to effect flexure of the bar which is dependent upon the force applied, means adapted to be positioned with respect to the angularly disposed means to determine the force required to effect a given flexure of the bar, an arm secured to one end of the flexible bar, and a plunger actuated dial indicator secured to the arm at a position spaced from the bar and so disposed that the plunger contacts the bar at a position spaced from the arm, said plunger being responsive to the flexure of the bar to actuate the indicator.

3. A dynamometer comprising, in combination, a bar having a flexible portion and end portions projecting angularly from the flexible portion, said end portions having openings therein, blocks adapted to fit into said openings, said blocks having openings therein displaced from the center of the block, means holding said blocks in place in the openings in said bar and with the openings in the blocks in predetermined positions with respect to the bar, means received in said openings for applying force to the bar to flex the same and indicating means responsive to flexure of the bar.

WILLIAM C. DILLON.